United States Patent [19]

Fantone

[11] Patent Number: 4,796,969
[45] Date of Patent: Jan. 10, 1989

[54] FIBER OPTIC RELAY CONNECTOR

[75] Inventor: Stephen D. Fantone, Saugus, Mass.

[73] Assignee: Polaroid Corporation, Cambridge, Mass.

[21] Appl. No.: 176,469

[22] Filed: Apr. 1, 1988

Related U.S. Application Data

[63] Continuation of Ser. No. 809,186, Dec. 16, 1985, abandoned.

[51] Int. Cl.$^4$ .............................................. G02B 6/32
[52] U.S. Cl. ................................................. 350/96.18
[58] Field of Search ............... 350/96.15, 96.18, 96.20, 350/96.21

[56] References Cited

U.S. PATENT DOCUMENTS

| | | | |
|---|---|---|---|
| 4,269,648 | 5/1981 | Dakss et al. | 156/293 |
| 4,371,233 | 2/1983 | Masuda | 350/96.18 |
| 4,421,383 | 12/1983 | Carlsen | 350/96.21 |
| 4,496,211 | 1/1985 | Daniel | 350/96.18 |
| 4,534,616 | 8/1985 | Bowen et al. | 350/96.20 |
| 4,632,505 | 12/1986 | Allsworth | 350/96.21 |
| 4,705,351 | 11/1987 | Toda | 350/96.18 |
| 4,718,746 | 1/1988 | Chrepta | 350/96.18 |

FOREIGN PATENT DOCUMENTS

| | | |
|---|---|---|
| 2002136 | 2/1979 | United Kingdom . |
| 2054896 | 2/1981 | United Kingdom . |

OTHER PUBLICATIONS

Singlemode Fiber with Consistent Quality Made in Britain and Japan, Fiberoptic Technology, Nov. 1981, p. 119.
Practical Low-Loss Lens Connector for Optical Fibres, A. Nicia, Electronics Letters, Aug. 3rd 1978, vol. 14, No. 16, pp. 511–512.

*Primary Examiner*—William L. Sikes
*Assistant Examiner*—Robert E. Wise
*Attorney, Agent, or Firm*—Francis J. Caufield

[57] ABSTRACT

A fiber optic connector in the form of a two-element relay system which transforms and matches the numerical apertures of an entering beam to that of the acceptance numerical aperture of the exiting optic where in general the numerical apertures can be different. In preferred form, the connector is a pair of spherical balls with their surfaces in contact at a point along an optical axis extending through the centers of the balls. The radii of the spherical balls and their material composition are such that they operate to image fibers or the like one onto the other with their numerical apertures matched when each of the fibers are in optical contact with a respective one of the spherical balls at a point along the optical axis opposite the point of contact. The radii and indices of refraction of the spherical balls can be adjusted to assure that optics with different numerical apertures are optimally coupled. Means are included for maintaining the spherical balls in contact while permitting connector adjustment for optimizing throughput.

3 Claims, 1 Drawing Sheet

FIBER OPTIC RELAY CONNECTOR

CROSS-REFERENCE TO RELATED APPLICATION

This is a continuation of application Ser. No. 809,186, filed Dec. 16, 1985, now abandoned.

BACKGROUND OF THE INVENTION

This invention in general relates to fiber optics and in particular to connectors for demountably coupling pairs of optical fibers or the like.

Communication by means of optical electromagnetic radiation transmitted along optical fibers is a well-established practice made possible over the past 25 years by developments in a number of areas including sources, detectors, and low-loss transmission fiber.

Compared with other medium of like size, a major advantage to optical fiber as a communications medium resides in its much higher capacity to transfer information. This comes about because a communication channel requires the same bandwidth wherever it operates in the spectrum, and the higher frequency optical regions where fibers operate inherently have higher channel and thus information carrying capacity. This major advantage, however, is also a major disadvantage when it comes to making connections between already small fibers because the consequences of signal loss are proportionately more severe.

To solve the coupling problem with minimal signal loss, those skilled in the art have taken two basic approaches to the design of connectors, devices by which fibers or other fiber optic elements can be optically coupled and decoupled with reasonable frequency.

The first basic approach involves the use of the precision butt joint. Here, practically achievable physical structures are employed to meet the axial, lateral, and azimuthal precision required for proper alignment with minimum loss. Usually, this approach reduces to the use of a ruggedized connector in which the fibers themselves are fixed in precision ferrules which thereafter are aligned to complete the ultimate positioning of the fibers with respect to one another.

The second basic approach involves the use of lenses to provide enlarged images of the fibers which then are physically aligned. The strategy here is to trade off the strict linear dimensional requirements involved with the butt joint approach against a more exact angular tolerance. Typically, the lens connector utilizes two symmetrically arranged lenses structured so that fibers placed at the focii are imaged one onto the other. The geometry which is of major importance using this approach is usually integrated into the optical structure, and the tolerances of importance relate to lens tilt, beam aiming, and the accuracy with which the fibers are located with respect to the focus of their respective lenses. As an example of this type of a connector, reference may be had to U.S. Pat. No. 4,421,383 issued to W. John Carlsen on Dec. 20, 1983 and entitled "Optical Fiber Connectors".

Although lens connectors are known in the art, it is a primary object of the present invention to provide improved lens connectors for coupling pairs of optical fibers or other fiber optic elements.

It is another object of the present invention to provide a lens connector which is easier to manufacture than previous connectors of this type.

It is yet another object of the present invention to provide a lens connector for coupling pairs of fibers or other elements having different numerical apertures.

Other objects of the invention will, in part, be obvious and will, in part, appear hereinafter. The invention accordingly comprises the structure exemplified in the detailed disclosure which is to follow.

SUMMARY OF THE INVENTION

This invention in general relates to fiber optics, but in particular to the design of a lens type connector by which pairs of similar or dissimilar optical fibers or other elements can be coupled and decoupled with reasonable frequency.

In its most general form, the connector of the invention comprises two dissiilar spherical balls whose surfaces are in contact with one another at a point along an optical axis passing through their centers. The radii and indices of refraction of the spherical balls can be different, but are related in such a way that a pair of fibers or other elements, each of which is in optical contact with the surface of a respective spherical ball at a point along the optical axis opposite the point of contact, are imaged one onto the other with their numerical apertures transformed and matched to assure optimum energy transfer between elements.

Optical contact between the spherical surfaces and the elements is achieved through the use of index matching material. The spherical balls are held in contact with one another by a mechanical arrangement whose design is such that the spherical balls initially can be easily rolled on one another to optimize throughput and thereafter can be fixed in place.

In special circumstances, the spherical balls can be of equal size and index or both and, in all cases, easily can be fabricated and aligned for optimal throughput.

BRIEF DESCRIPTION OF THE DRAWINGS

The novel features that are considered characteristic of the invention are set forth with particularity in the appended claims. The invention, itself, however, including its organization, material structure, and method of operation, together with other objects and advantages thereof, will best be understood from the following detailed description when read in connection with the accompanying drawings wherein the same number has been used to denote a part wherever it appears in the figures and wherein:

DETAILED DESCRIPTION

Figure 1:
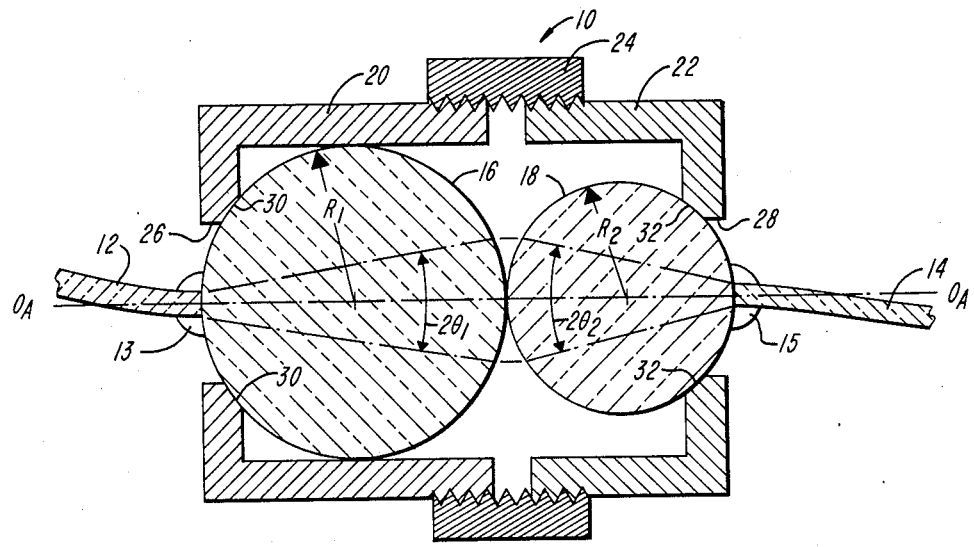
FIG. 1 is a diagrammatic elevational view of the connector of the invention with parts of it shown in section.

The present fiber optic connector, designated generally at 10 in FIG. 1, is a two element relay system which transforms and matches the numerical aperture (NA) of an entering beam of radiation to that of the acceptance numerical aperture of the exiting optic where in general the NA's of entering and emerging beams can be different. As such, its use is not restricted to just the coupling of optical fibers, although it is particularly suitable for that purpose. Other fiber optic coupling tasks which it may perform include, for example, the formation of links between source and detector, source and fiber, or detector and fiber.

In FIG. 1, connector 10 is illustrated as a means by which a pair of optical fibers, 12 and 14, with perfectly general physical and optical properties are coupled to one another for the efficient transfer of radiation between them. For this purpose, connector 10 comprises as its two element relay system a pair of spherical balls, 16 and 18. The radii and indices of refraction of balls 16 and 18 are $R_1$ and $R_2$ and $N_1$ and $N_2$, respectively, while the numerical apertures of fibers 12 and 14 are $NA_1$ and $NA_2$, respectively, where $NA_1 = N_1 \sin\theta_1$, and $NA_2 = N_2 \sin\theta_2$. In general, all of these parameters can take on different numerical values depending on the particular coupling task, but the values which they take on are not independent of one another. Instead, values that the foregoing parameters can have are related by mathematical expressions which define the limits of possible variation in the parameters while still assuring both proper imaging and numerical aperture transformation from one fiber to the other.

Now referring again to FIG. 1, it is seen that the spherical balls, 16 and 18, are in contact with one another at a point, P, which is along the optical axis, OA, a line drawn through and extending beyond the centers of spherical balls, 16 and 18.

Fibers 12 and 14 are in optical contact with the surfaces of spherical balls, 16 and 18, respectively, at points on the optical axis, OA, opposite the joint, P, at which spherical balls, 16 and 18, are in contact.

The fibers, 12 and 14, are for this purpose glued in place with index matching epoxy shown at 13 and 15, respectively.

The optical path length from the end of fiber 12 taken as object position to point, P, is the reduced distance $N_1/2R_1$ and from point, P, to the end of fiber 14, taken as image distance, is the reduced distance $N_2/2R_2$. If one assumes that the spherical balls, 16 and 18, can be replaced by thin lenses in contact at point, P, each followed by a thickness of, say, glass with the reduced distances, then the paraxial condition for imaging the end of fiber 12 onto the end of fiber 14 is given by:

$$(N_1/2R_1) + (N_2/2R_2) = (N_1 - 1)/R_1 + (N_2 - 1)/R_2 \quad (1)$$

Expanding and collecting terms and letting $K = N_2/N_1$, equation (1) can be rewritten in more convenient form as:

$$N_1 = 2(R_1 + R_2)/(R_2 + KR_1) \quad (2)$$

If one lets $p = R_2/R_1$, then equation (2) can also be written as:

$$N_1 = 2(1 + p)/(K + p) \quad (3)$$

Thus, equations (2) and (3) represent various parameters for given ranges of other related parameters to satisfy the imaging requirement.

For example, suppose $p = 1$. Then $R_1 = R_2$ and $N_1 = 4(K + 1)$ and $N_2 = 4K/(K + 1)$. For the case where the radii are equal, one has the variation in K with $N_1$ in the form of a curve relating the two. Consequently, $N_2$ is always known as well.

If the indices and radii are to vary, it is easier to work with plots generated using the equation (3) form of the imaging condition.

Now, it can be shown that the connector 10 to transform the numerical aperture of fiber 12 ($NA_1$) to match that of fiber 14 ($NA_2$) requires satisfaction of the following transformation ratio:

$$T = NA_2/NA_1 = (R_1 N_2)/(R_2 N_1) \quad (4)$$

or in rewritten form:

$$NA_2 = (K/p)NA_1 \quad (5)$$

In terms of relative aperture, equation (4) becomes:

$$T = (F_1/\#)/(F_2/\#) \quad (6)$$

For example, suppose you wish to convert an F/1.5 (NA = 0.33) source to an F/3.0 cone (NA = 0.166) for coupling to a fiber. Here $T = 0.5$ and $K/p = 0.5$. Now $N_1 = 2(1 + p)/K + p) = 2(1 + 1/p)/(1 + T) = 2(1 + 1/p)/1.5$. With $N_1 = 1.5$, then $2/p = 0.125$ and $p = 16$. K is then 8 and $N_2$ is an unreasonably high index of refraction value so you need to assume a different value for $N_1$, say $N_1 = 2.0$. Going through a similar iterative process for $N_1 = 2.0$, one finds $N_2 = 2.0$ also. Similarly, with $N_1 = 1.78$, $N_2 = 2.65$ and with $N_1 = 1.85$, $N_2 = 2.38$.

So, the design approach is an iterative one, assuming just some values of the parameters and then calculating what the others must be to satisfy imaging and numerical aperture transformation equations. One then examines these calculated values to see if they are realistic in terms of sizes and materials available. If not, the initial assumptions are changed and the calculations redone until satisfactory values for all parameters are found.

The recommended iterative approaches are to start with $K = 1$ and then calculate p. This will indicate how to perform the transformation just using spherical balls of different size. Alternatively, let $p = 1$ and calculate K. Then calculate $N_1$ and $N_2$. If these values are not realistic, assume p is not equal to 1.

There are a number of special cases. If $N_1 = 2.0$, then K must equal 1. This is so because with $N_1 = 2.0$ the light exiting the first ball is collimated and independent of ball radius. Hence, to focus this light on the back of the second ball, $N_2$ must also equal 2.0. Where $N_1$ is not equal to 2.0, then $N_2$ is not equal to 2 by symmetry.

If $p = 1$, then alignment can be achieved by a sleeve since $R_1 = R_2$. From a practical standpoint for the near IR (0.8 micrometers), T ratios of 1.6 can be obtained. For example, if $T = 1.58$, $N_1 = 1.55$, and $N_2 = 2.45$. By using crystalline materials such as Si, Ge, or $SbS_3$, even larger T ratios are possible.

Spherical balls 16 and 18 are held in contact through the use of the mechanical arrangement of FIG. 1, comprising housings 20 and 22, both of which screw into sleeve 24. Each housing, 20 and 22, includes an aperture 26 and 28, respectively, which have interior bevels 30 and 32, respectively. The angles for the bevels, 30 and 32, are selected to accommodate a range of radii such that the balls are always tangent to the beveled surface.

In operation, the housings 20 and 22 are advanced into the sleeve 24 until spherical balls, 16 and 18, are touching at point P, but with just enough force to bring them into contact while with not so much force that they will not rotate. To optimize fiber throughput, one fiber is excited and the output of the other monitored while the spherical balls 16 and 18 are rotated or rolled on one another until optimum throughput is observed. Afterward, balls 16 and 18 are fixed in place with any appropriate means such as a suitable epoxy adhesive.

Figure 2:
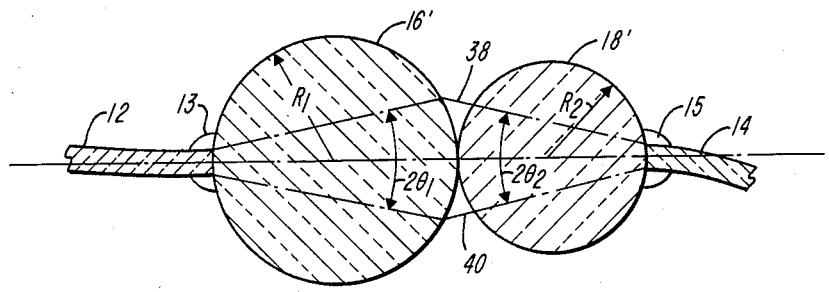
FIG. 2 is a diagrammatic representation showing an alternative arrangement for practicing part of the invention.

Collimation of the radiant beam emerging from one spherical ball isn't required for proper operation of the connector 10. As shown in FIG. 2, for example, with rays 38 and 40, the beam of radiation emerging from one ball (16') can be either converging or diverging, depending on perspective, with the necessary power correction provided by the remaining ball (18').

Thus, the foregoing analysis details the relationship between refractive index and ball diameter ratio for a two ball coupling arrangement. It is assumed that all sources and sinks were in contact with the surface of a ball. Although this is not strictly necessary, it does simplify the mathematics somewhat. To obtain a small back focus, the refractive index of one or both balls can be lowered slightly or in some cases, the radii of the balls can be lowered slightly.

This geometry for a connector has several distinct advantages. First, focus is not an issue. It is primarily dependent on refractive index and only weakly dependent on ball diameter. Alignment is adjusted by rolling the balls on one another. This is a positive adjustment that is readily accomplished.

Those skilled in the art may practice the invention in other ways in accordance with its teachings and still be within its scope. For example, one can have the end of the fiber optic element at some finite distance out of contact with a spherical ball and simply introduce this distance into the appropriate imaging and transformation equations to design the relay system. Therefore, it is intended that all matter contained in the above description or shown in the accompanying drawings shall be interpreted as illustrative and not in a limiting sense.

What is claimed is:

1. A connector for optically coupling a pair of fiber optic elements, said connector comprising a pair of spherical balls with their surfaces in physical contact with one another at a point along an optical axis through their centers, said spherical balls being composed of material that is transparent to radiation at the operating wavelengths of said fiber optic elements, the radii of said spherical balls and the index of refraction of said materials belonging to that set of combinations of radii and indices that provide said spherical balls with the property of imaging one of said fiber optic elements onto the other with their numerical apertures matched when each of said fiber optic elements are respectively in optical contact with the surface of one of said spherical balls at a point thereon opposite said point of contact and along said optical axis to assure that substantially all of the radiation emerging from either fiber optic element is coupled into the other, said indices of refraction and radii of said spherical balls being related by:

$$N_1 = 2(R_1 + R_2)/(R_2 + KR_1)$$

to satisfy that one fiber optic element is imaged onto the other and by:

$$T = (R_1 N_2)/(R_2 N_1)$$

to assure that the numerical apertures of said fiber elements match while said fiber elements are imaged one onto the other where:

$R_1$ and $R_2$ are the radii of said spherical balls;
$N_1$ and $N_2$ are the indices of refraction of said spherical balls;
$K = N_2 N_1$; and
$T =$ the ratio of the numerical apertures of said fiber elements.

2. The connector of claim 1 wherein said connector additionally includes means for movably holding said spherical balls in abutting relationship at said point of contact.

3. The connector of claim 2 wherein said means for holding said spherical balls in abutting relationship at said point of contact are further structured so that, when said spherical balls are brought into contact with one another, they can initially be rotated to optimize throughput and afterwards be fixed in place with respect to one another.

* * * * *